INVENTOR.
RUFUS F. DICKSON
BY
Gene W Arant
ATTORNEY

Jan. 17, 1967  R. F. DICKSON  3,298,148
TIE-DOWN HOLES
Filed May 20, 1964  2 Sheets-Sheet 2
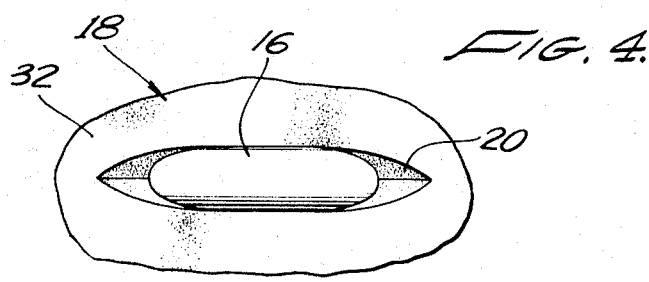
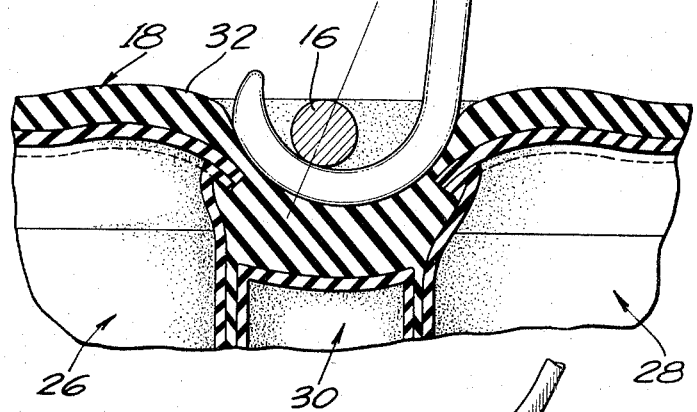
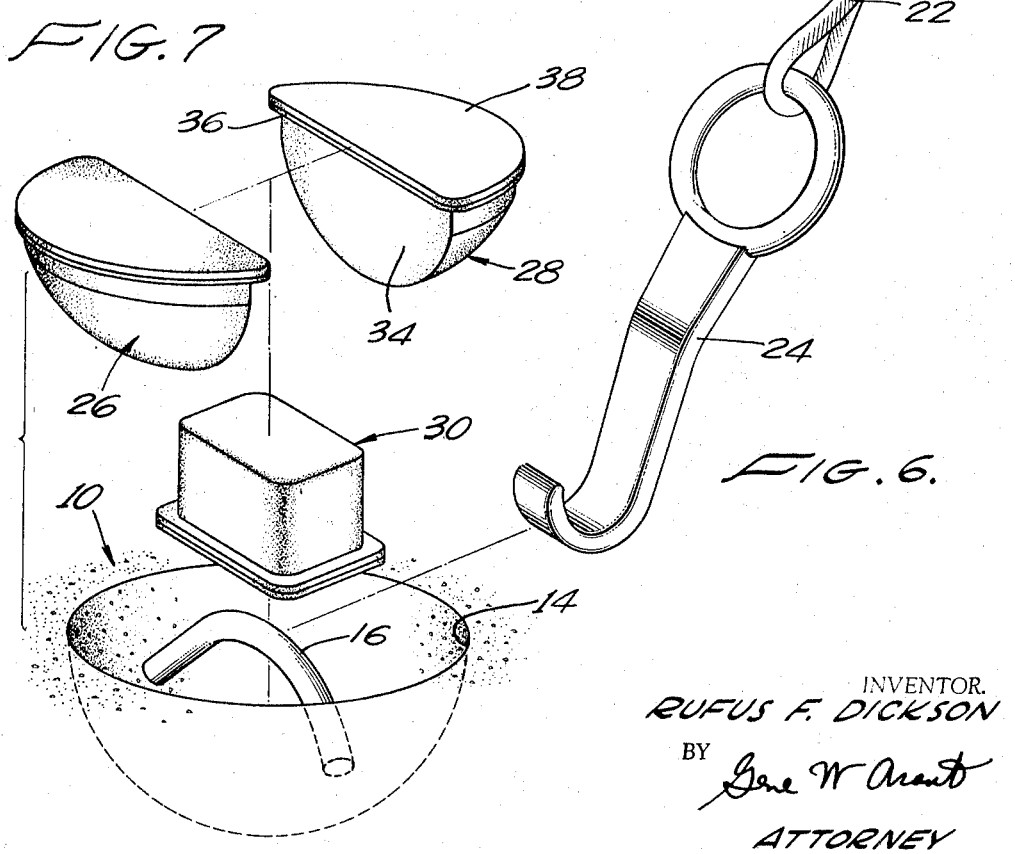
INVENTOR.
RUFUS F. DICKSON
BY
Gene W Arant
ATTORNEY

United States Patent Office 3,298,148
Patented Jan. 17, 1967

3,298,148
TIE-DOWN HOLES
Rufus F. Dickson, 525 Arbolado Drive,
Fullerton, Calif. 92632
Filed May 20, 1964, Ser. No. 368,954
9 Claims. (Cl. 52—309)

This invention relates generally to moorings for use in tethering parked aircraft against movement. The invention relates more particularly to improvements in aircraft moorings, or tie-downs as they are commonly called, of the kind which are recessed into the surfaces of aircraft mooring areas, such as runways, parking aprons, aircraft carrier decks, and the like.

The recessed aircraft mooring of this invention constitutes an improvement on the aircraft mooring disclosed in my co-pending application Serial No. 225,425, filed September 21, 1962, and entitled "Tie-down Holes," which is now abandoned.

Most, if not all airports and aircraft carriers, as well as many other aircraft utility areas, are equipped with moorings, commonly referred to as tie-downs, for tethering parked aircraft against movement. One of the most widely used moorings for this purpose consists of a metal anchor, such as a U-bolt, rigidly fixed within a cavity in the surface of the aircraft mooring area in such manner that the anchor is substantially flush with the surface. An aircraft is tethered to the mooring by a mooring line which is attached at one end to the aircraft and at the other end to the recessed anchor of the mooring. Generally, each aircraft is thus tethered to several moorings spaced about the aircraft.

While the existing recessed moorings, or tie-downs, of this type are capable of providing a firm anchorage for aircraft, they possess certain inherent disadvantages. For example, water, dirt, and other debris tend to collect in the mooring cavities. Accordingly, the cavities must be periodically cleaned. Brush-type sweeping equipment, however, is ill-suited to cleaning such cavities. Vacuum cleaning equipment, on the other hand, while better adapted to removing debris from the mooring cavities, is costly and time consuming to operate.

The existing recessed aircraft moorings present a more serious problem when they are situated in aircraft running areas, such as runways and aircraft carrier flight decks, which are traversed by jet aircraft. This latter problem resides in the fact that debris which does collect in the mooring cavities is frequently drawn into the intakes of the jet engines. In many cases, the ingested debris causes serious engine damage. Current estimates, for example, place the annual cost of jet engine damage due to the ingestion of runway debris in the millions of dollars.

The problems discussed above are magnified many times in the case of large airports which may be equipped with several hundred recessed aircraft moorings. Accordingly, there is an urgent need for an improved recessed aircraft mooring which does not possess the above mentioned and other disadvantages of the existing moorings.

It is a general object of this invention to provide such an improved recessed aircraft mooring.

A more specific object of the invention is to provide an improved recessed aircraft mooring which is uniquely constructed to prevent the accumulation of debris in the mooring cavity.

Another object of the invention is to provide an improved recessed aircraft mooring which greatly simplifies the task of cleaning airport runways and other areas traversed by jet aircraft, whereby the cost of maintaining these areas free of debris, and jet engine damage caused by the ingestion of such debris, are significantly reduced.

Yet another object of the invention is to provide an improved recessed aircraft mooring which is simple in construction, economical to fabricate, easy to use, immune to freezing and damage from jet engine exhaust, and is otherwise ideally suited to its intended purpose.

Other objects, advantages, and features of the invention will become readily evident as the description proceeds.

Briefly, the objects of the invention are attained by providing an aircraft mooring, or tie-down, equipped with a metal anchor which is rigidly fixed within a cavity in the surface of an aircraft mooring area. The cavity contains a resilient filler, the upper surface of which is normally substantially flush with the surface of the area so that debris is prevented from entering and accumulating in the mooring cavity. The resilient filler normally forms itself about the metal anchor and is depressable to expose the anchor for attachment to a tethering line.

A primary and highly important feature of the invention resides in the unique construction of the resilient filler, whereby the latter is immune to freezing and to damage from jet engine exhausts. As a consequence, the present improved aircraft mooring is uniquely adapted to its intended purposes and may be used in cold as well as warm climates.

A better understanding of the invention may be had from the following detailed description of a presently preferred embodiment thereof, taken in connection with the annexed drawings wherein:

FIGURE 4 is a view looking in the direction of the arrows on line 4—4 in FIGURE 3;

FIGURE 5 is an enlarged section of a portion of the present mooring, illustrating the hook of an aircraft mooring line engaged with the mooring anchor;

FIGURE 6 is a perspective view of the mooring hook in FIGURE 5; and

FIGURE 7 is a perspective view of certain components of the present aircraft mooring prior to installation of such components in the mooring cavity.

Figure 1:
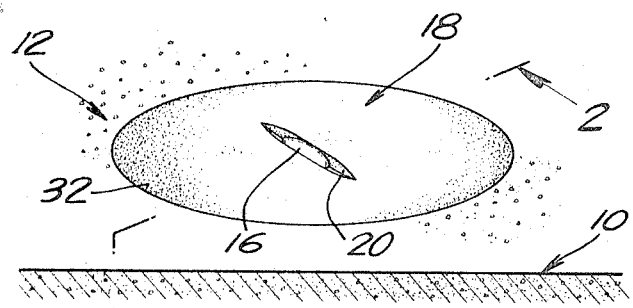
FIGURE 1 is a perspective view of an aircraft mooring area containing an improved recessed aircraft mooring according to the invention.

In these drawings, 10 denotes an aircraft mooring area containing an improved recessed aircraft mooring, or tie-down, 12 according to the invention. As already noted, the mooring area 10 may be a runway or parking apron of an airport, the deck of an aircraft carrier, or other surface area designed for use by aircraft, particularly jet aircraft. In the drawings, the mooring area 10 is assumed to be the paved runway or parking apron of an airport.

Figure 2:
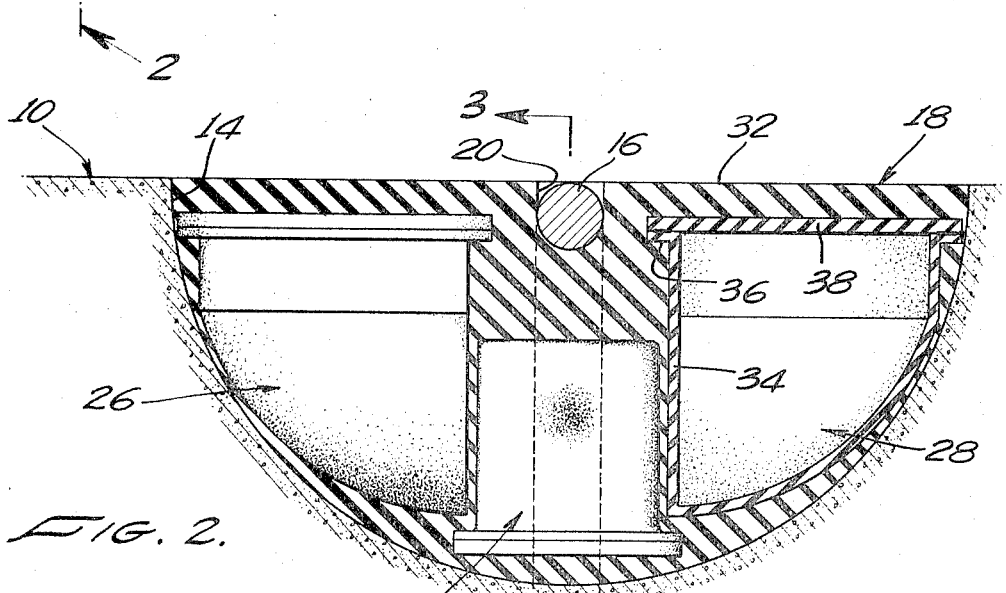
FIGURE 2 is an enlarged section taken along line 2—2 of FIGURE 1.
Figure 3:
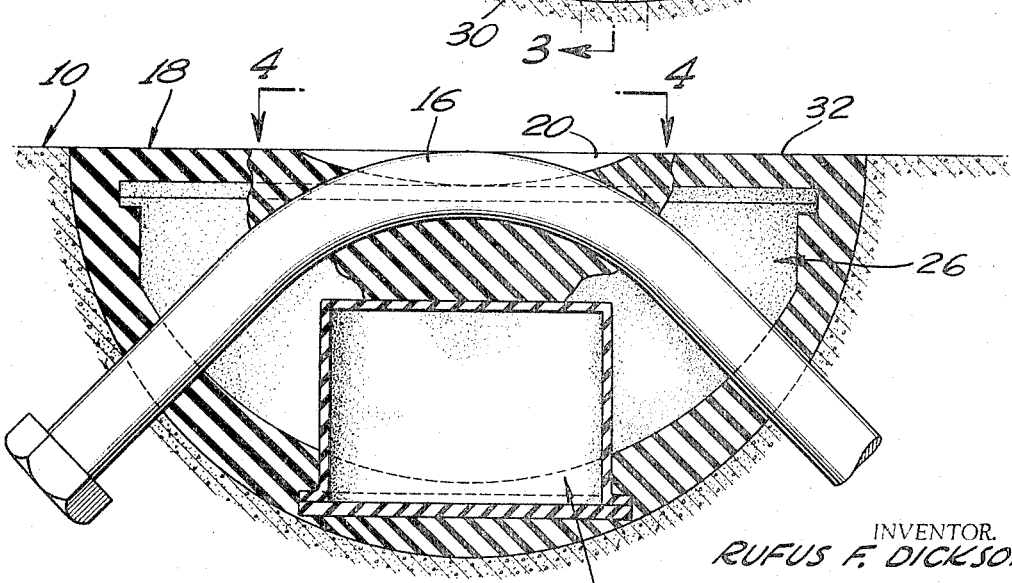
FIGURE 3 is a section taken along line 3—3 in FIGURE 2.

The improved mooring, or tie-down, 12 of this invention comprises a cavity 14 in the surface of the mooring area 10. This cavity is typically hemi-spherical in shape, as illustrated. Rigidly fixed within the mooring cavity 14 is a metal anchor 16. Anchor 16 is shown to be a generally U-shaped bolt which is disposed in an inverted position within the cavity and has its ends imbedded in the pavement of the mooring area 10 at diametrically opposite sides of the cavity. The upper bend of the anchor bolt is substantially flush with the surface of the mooring area. Cavity 14 contains a resilient filler 18. The construction of this filler, to be described shortly, constitutes a primary, and highly unique feature of the invention. As shown best in FIGURES 2 and 3, the upper surface of the filler 18 is normally substantially flush with the surface of the mooring area 10. In this upper surface of the filler is a recess 20 which exposes a portion of the upper bend of the anchor 16 to facilitate engagement of an aircraft tether line 22 with the anchor, in the manner illustrated in FIGURE 5.

When the mooring 12 is not in use, the filler 18 forms itself about the anchor and completely fills the cavity 14 to the surface level of the mooring area 10. Dirt, water, and other debris are thus prevented from entering and collecting in the cavity, as may occur in conventional recessed aircraft moorings. A mooring area containing the present improved aircraft moorings, therefore, can be easily cleaned with sweeping equipment in contrast to the costly vacuuming equipment which is required to clean mooring areas containing conventional recessed moorings. Aircraft jet engine damage occasioned by the ingestion of runway debris into the engine intakes is thus significantly reduced by the present improved moorings.

When tethering an aircraft (not shown) to the mooring 12, one end of the mooring line 22 is attached to the aircraft and the other end of the line is attached to the mooring anchor 16. While the mooring line may be simply tied to the anchor, it is more expedient to provide the line with a hook, such as is illustrated at 24 in FIGURES 5 and 6, for engaging the anchor. The mooring hook is engaged with the anchor 16 by first depressing the filler 18 of the mooring, about the upper bend of the anchor, to expose the latter and form a space between the under surface of the bend and the filler through which the hook may be inserted to the position in FIGURE 5. When the tether hook is removed, the inherent resiliency of the filler 18 restores the latter to its original condition of FIGURES 2 and 3, wherein the filler reforms itself about the upper bend of the anchor and again completely fills the cavity.

As noted earlier, the construction of the filler 18 constitutes a primary and highly unique feature of the invention. Thus, in the event that the present recessed mooring is intended for use only in warm climates where the ambient temperature never drops to freezing, the filler 18 may comprise a single homogeneous mass of a compressable sponge-like material, such as plastic foam having urethane as its principal ingredient. A cavity filler of this type, however, is ill-suited to use in climates where the ambient temperature does drop to freezing. The reason for this is that the filler absorbs water which freezes when the temperature drops, thereby rendering it difficult or impossible to engage an aircraft tether hook with the anchor 16, at least without damaging the filler. In addition, the filler may be damaged by repeated freezing and thawing.

It is preferable, in the case of aircraft moorings of this type, to design the mooring for service in any climate rather than designing one mooring for use in warm climates and another for use in cold climates. The illustrated mooring 12 is designed for use in all climates, and particularly for use in climates where the ambient temperature may drop to or below freezing. This advantage of the illustrated mooring 12 is attained primarily by the unique construction of the filler 18.

The major volume of filler 18 is furnished by flexible, water-impermeable air chambers 26, 28 and 30. The remaining volume of the filler is composed of a binder 32 in which the air chambers 26, 28 and 30 are imbedded. The binder 32 serves the dual function of bonding the air chambers to one another and to the wall of the mooring cavity 14, thereby to retain the filler as a whole, and particularly the air chambers, in the cavity and filling the cavity volume not occupied by the chambers. While various materials may be suitable for the air chambers 26, 28 and 30 and for the binder 32, the chambers are preferably constructed of rubber and the binder preferably comprises polyurethane plastic which is simply poured (not foamed) into the mooring cavity, as explained shortly.

Air chambers 26 and 28 are substantially identical, and each includes a chamber-defining wall 34 having an open side bounded by an outwardly directed flange or lip 36.

The open side of the chamber-defining wall 34 is closed by a flat wall 38 which is bonded to the lip 36, thereby to provide a hermetic air chamber. The remaining air chamber 30 is similarly constructed except that the latter chamber has a generally rectangular configuration in contrast to the generally semi-spherical configuration of the chambers 26 and 28. Each of the chambers 26, 28 and 30 is filled with air preferably at atmospheric pressure. The chamber walls are relatively thin and compliant, whereby the filler 18 may be readily compressed to expose the anchor 16, in the manner explained earlier. The spherically curved chambers 26 and 28 are positioned at opposite sides of the plane of the anchor bolt 16 with the flat chamber walls 38 uppermost. The remaining chamber 30 is placed between the chambers 26 and 28, beneath the upper bend in the anchor bolt 16. While the major volume of the filler 18 might be furnished by one large, suitably configured air chamber, rather than three separate air chambers as illustrated, it has been found that a single large chamber is inferior to a plurality of smaller separate chambers. Accordingly, the use of separate chambers, as illustrated, is the preferred practice of the invention.

According to the preferred method of fabricating the illustrated aircraft mooring, liquid polyurethane plastic is poured over the bottom and sides of the mooring cavity 14 and is then permitted to set until it becomes tacky and thereby acquires an adhesive quality. A typical setting time, for example, may be on the order of one hour. Thereafter, the air chambers 26, 28 and 30 are inserted into the partly filled cavity and are forced into the partially set polyurethane plastic so that they become imbedded in the plastic. Additional polyurethane plastic is now poured into the cavity as required to bring the level of the plastic up to the surface level of the mooring area 10. The plastic filler is then permitted to set until finally cured, which may involve a setting time of four or five hours.

In the completed mooring 12, the chambers 26 and 28 should be sufficiently below the surface level of the mooring area 10 that the layers of polyurethane plastic above the chambers are on the order of ⅜ of an inch to ½ inch in thickness. This thickness is preferable to avoid straining of the plastic in the layers beyond its elastic limit when the filler 18 is depressed to expose the anchor 16.

The advantages of the present improved recessed aircraft mooring, or tie-down 12, are apparent. Thus, because of the compliancy of the air chambers 26, 28, and 30 in the filler 18 of the mooring, which chambers occupy the major volume of the filler, the latter may be readily compressed to expose the anchor 16 when it is desired to tether an aircraft to the mooring. When the tether line is disengaged from the mooring, the filler returns to its normal condition of FIGURES 2 and 3, wherein it completely fills the mooring cavity 14, by virtue of the inherent resiliency of the polyurethane binder 32 and the air chambers 26, 28, and 30. The primary advantage of the illustrated mooring resides in the fact that the air chambers are impermeable to water, whereby any water which does enter the mooring cavity will be absorbed only by the polyurethane binder 32. All of the sections of this binder which are required to flex, compress, or otherwise distort during compression of the filler 18 to expose the anchor 16, however, are relatively thin so that should the water in these sections of the binder freeze, the resulting ice will easily crack without damaging the filler when the latter is compressed to expose the anchor.

It is evident, therefore, that the invention herein described and illustrated is fully capable of attaining the several objects and advantages preliminarily set forth.

While a presently preferred embodiment of the invention has been disclosed for illustrative purposes, it will be immediately apparent to those skilled in the art that various modifications of the invention are possible within the spirit and scope of the following claims.

I claim:
1. A mooring for an aircraft mooring area having a mooring cavity in the surface thereof, comprising:
   a metal anchor rigidly mounted within said cavity,
   a complaint, locally compressible filler within and bonded to the walls of said cavity,
   said filler substantially completely filling said cavity and the upper surface of said filler being substantially flush with the surface of said mooring area, whereby debris is prevented from entering and collecting in said cavity, and
   said filler having a recess in its upper surface through which said anchor is accessible and being locally compressible about said recess to expose said anchor for attachment to an aircraft tether line.

2. An aircraft mooring according to claim 1 wherein:
   said anchor is normally partially exposed through said filler recess.

3. A mooring for an aircraft mooring area having a mooring cavity in the surface thereof, comprising:
   a metal anchor rigidly mounted within said cavity,
   a complaint, locally compressible filler within and substantially completely filling said cavity including compliant, locally compressible air chamber means within the cavity and a compliant, locally compressible binder filling the cavity about said anchor and chamber means and adhesively bonded to the chamber means and the wall of the cavity,
   the surface of said filler being substantially flush with the surface of said mooring area, whereby debris is prevented from entering and collecting in said cavity, and
   said filler having an upper opening through which said anchor is accessible and being locally compressible about said opening to expose said anchor for attachment to an aircraft tether line.

4. An aircraft mooring according to claim 3 wherein:
   said chamber means comprise a plurality of separate chambers spaced about said cavity.

5. An aircraft mooring according to claim 3 wherein:
   said chamber means comprise walls of flexible compliant material, such as rubber.

6. A mooring according to claim 3 wherein:
   said chamber means comprise a pair of separate chambers disposed at opposite sides of said anchor and a third chamber disposed between said pair of chambers and between said anchor and cavity wall.

7. A mooring for an aircraft mooring area having a generally semi-spherical mooring cavity in the surface thereof, comprising:
   a metal, inverted U-shaped anchor bolt within said cavity and having its opposite ends rigidly secured to said mooring area at diametrically opposite sides of said cavity,
   a pair of compliant, locally compressible air chambers disposed within said cavity at opposite sides of said anchor bolt and having spherically curved walls confronting and of a radius somewhat less than the radius of the cavity wall,
   a third compliant, locally compressible chamber between said pair of chambers and below said anchor bolt,
   a compliant, locally compressible binder filling said cavity about said chambers and anchor bolt and adhesively bonding said chambers to one another and to the wall of said cavity,
   said binder and chambers forming a compliant, locally compressible filler within said cavity which substantially completely fills the cavity, the upper surface of said filler being substantially flush with the surface of said mooring area, whereby debris is prevented from entering and collecting in said cavity, and
   said filler having an upper opening through which said anchor is accessible and being locally compressible about said opening to expose said anchor for attachment to an aircraft tether line.

8. A mooring according to claim 7 wherein:
   said binder comprises polyurethane plastic which is poured into said cavity about said chambers and anchor.

9. A mooring according to claim 7 wherein:
   the upper surfaces of said pair of chambers are disposed a distance below the surface of said mooring cavity and there is a thin layer of said binder above said chambers.

References Cited by the Examiner
UNITED STATES PATENTS

| | | | |
|---|---|---|---|
| 1,902,977 | 3/1933 | Tomagna | 52—587 |
| 2,366,656 | 1/1945 | Staffert | 52—698 |
| 2,383,950 | 4/1945 | Baliman | 52—709 |
| 3,216,171 | 11/1965 | Jenkins | 52—705 |

FRANK L. ABBOTT, *Primary Examiner.*

J. L. RIDGILL, *Assistant Examiner.*